Nov. 19, 1940.    W. J. GEIGER ET AL    2,221,868
GLASS-TO-METAL SEAL
Filed Sept. 23, 1938

Inventors:
Walter J. Geiger,
Wilson Davidson,
by Harry E. Dunham
    Their Attorney.

Patented Nov. 19, 1940

2,221,868

UNITED STATES PATENT OFFICE 2,221,868

GLASS-TO-METAL SEAL

Walter J. Geiger, Cleveland Heights, and Wilson Davidson, Cleveland, Ohio, assignors to General Electric Company, a corporation of New York Application September 23, 1938, Serial No. 231,394

1 Claim. (Cl. 250—27.5)

Our invention relates generally to glass-to-metal seals and particularly to seals of the type in which a cylindrical tube of glass is sealed to a metallic tube disposed within the said glass tube. Still more particularly, our invention relates to such glass-to-metal seals as applied to electric lamps or similar devices comprising an electric energy translation element sealed in a glass envelope. While not limited thereto, our invention is particularly applicable to electric incandescent lamps of the type described and claimed in co-pending United States patent application Serial No. 139,912, A. Greiner, filed April 30, 1937, and assigned to the assignee of the present application.

In the manufacture of electric incandescent lamps of the type disclosed in the aforesaid co-pending application, considerable difficulty has been experienced in the production of a good and effective seal between the glass envelope and the metallic end cap or thimble which seal will be strong and sufficiently resistant to fracture. In the seals as heretofore made, the glass of the lamp envelope tended to crack at the rim or edge of the metallic thimble. This tendency of the glass to fracture is attributable primarily to the strains created in the glass at such point. However, by shaping the metallic end cap or thimble and forming the seal according to our invention, all tendency of the seal to crack is completely eliminated. Accordingly, one object of our invention is to provide a strong and effective seal between a glass tube and a metallic tube disposed within the glass tube which seal will be highly resistant to fracture.

Another object of our invention is to provide an electric lamp or similar device in which the glass envelope of the lamp is sealed directly to a metallic end closure member in such a manner as to form an effective hermetic seal therebetween which will not crack and break apart under normal conditions.

Still another object of our invention is to provide a hermetic seal between a metal tube or thimble and a surrounding glass tube in which the metal tube is sealed directly to the inner wall of the glass tube and is formed at one end thereof with an outwardly extending flare which is embedded in the glass of the surrounding glass tube to thereby produce a strong and effective seal which will not readily fracture.

Figure 1:
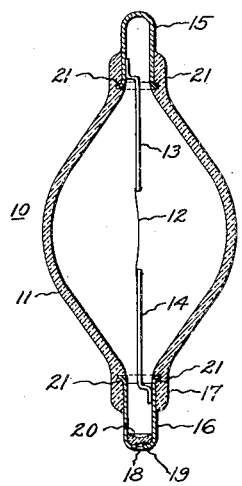
Figure 2:
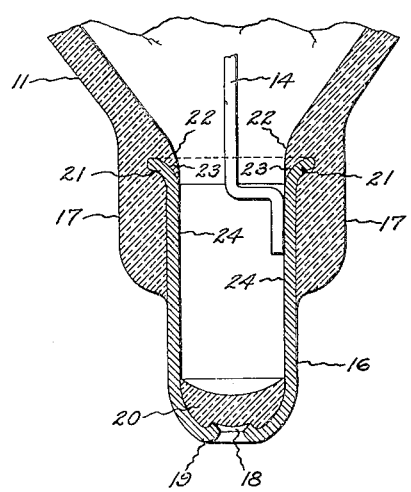
Figure 3:
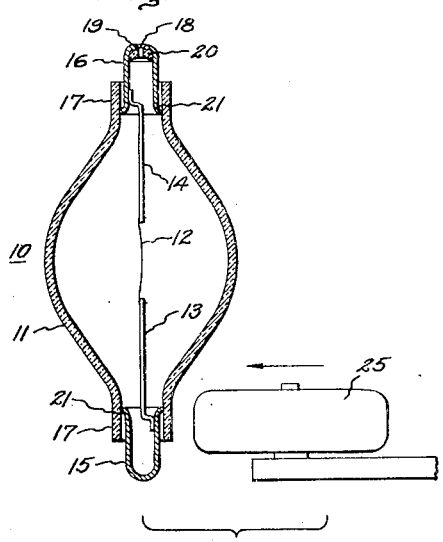

Further objects and advantages of our invention will appear from the following detailed description of a species thereof and from the accompanying drawing, in which Fig. 1 is a longitudinal sectional view of an electric incandescent lamp provided with a seal according to our invention; Fig. 2 is an enlarged fragmentary sectional view of the seal portion of the lamp shown in Fig. 1; and Fig. 3 is a view similar to Fig. 1 showing the method of forming the seal between the glass lamp envelope and the end closure member.

Referring to the drawing, the improved glass-to-metal seal comprising our invention is shown in connection with an electric incandescent lamp 10 of the type disclosed in the aforesaid co-pending United States patent application Serial No. 139,912. The said lamp 10 comprises a glass envelope or bulb 11 in which is mounted a filament 12. The said filament is supported in the bulb 11 by means of support or lead wires 13, 14 connected to opposite ends of the filament. The lead wires 13, 14 are spot welded to opposite end closure or contact members 15, 16 sealed by fusion directly to the tubular neck portions 17 of the lamp bulb 11. The contact members or thimbles 15, 16 are substantially cylindrical, being of relatively small diameter, and are preferably made of chrome iron or some other suitable metal having a coefficient of expansion such that it will readily wet and seal to the glass of the bulb 11 without cracking the same. Thimble 16 is provided with a small orifice or aperture 18 in the end wall 19 thereof through which evacuation of the bulb is effected. After evacuation of the bulb, the aperture 18 is closed by means of a readily fusible substance 20, such as glass, as described and claimed in the said co-pending application.

In making a strong and effective seal between the bulb neck 17 and the relatively small-diameter metallic thimbles 15 and 16, a number of important factors are involved which give rise to difficult problems. In the first place, the metal surface to be sealed to the glass must be heated to a point sufficiently high to permit the glass to flow easily thereon and also to enable the glass to absorb a sufficient amount of the oxide coating on the metal. Since it is necessary, during the seal forming operation, to support the thimbles 15, 16 in chucks, and also to limit the temperature of the end of the thimble 16 containing the readily fusible material 20 so as to prevent fusion of the same and consequent closing of the evacuation orifice 18, most of the sealing heat must, of necessity, be supplied to the metal thimbles indirectly, i. e., through the glass of the bulb neck. The heating of the metal thimbles is thus largely limited to the heat conducted to it by the glass, so that it is difficult to heat the metal to the required degree to form a good seal. Another factor involved in the formation of a good glass-to-metal seal is the prevention of a sharp joint between the glass and the metal; that is to say, a joint in which the unsealed adjacent surfaces of the glass and metal converge sharply toward the point of contact at an acute angle or even at right angles, the angle being measured through the open space between said surfaces. Otherwise strains will be present in the glass at the seal which will result in breakage of such seal.

The above-mentioned difficulties involved in the sealing of the glass bulb neck 17 to the metallic thimbles 15 and 16 are surmounted according to the invention by forming the edge or rim of the inner or open end of the metal thimble with a small outwardly extending flare 21. As shown in the drawing, the said flare 21 is rounded, as distinguished from a sharp-angled flange extending outward at right angles from the surface of the thimble. As shown in Fig. 2, this flare 21 projects into the glass of the bulb neck 17 so as to be entirely embedded in the glass. The inner surface 22 of the glass envelope 11 accordingly approaches the inner curved surface 23 of the metallic thimble at an acute angle and approximately in alignment with the straight inner surface 24, thus preventing the setting up of strains in the glass at such point. Furthermore, since both the inner and outer sides of the flare 21 are covered with the glass of the bulb neck 17, heat is therefore conducted to both sides of the flare by the glass. The flare is accordingly heated to a much higher degree than it would be if only the outer surface of the thimble end were covered with glass. This is a very important feature, inasmuch as it enables the metal at the flare 21 to be heated to the required temperature of approximately 1000° C. to thereby produce a hermetically effective union of glass-to-metal at such point.

The radius of curvature of the flare 21 is quite critical, and must be held within certain limits in order to thereby obtain the advantages of the invention. We have determined that the radius of curvature should not be less than 1/64th of an inch nor appreciably greater than the extent of the outward projection of the flare beyond the outer surface of the thimble, i. e., in a direction perpendicular thereto. Thus, for a thimble of 1/8th inch outside diameter, such as is illustrated in the drawing, the radius of curvature of the flare 21 is preferably 0.020 inch. Where the radius of curvature is made smaller than the above limits, an air pocket is apt to form between the outer or concave surface of the flare and the adjacent glass, thereby weakening the seal, while a radius of curvature larger than the above limits is very apt to result in the formation of a sharp joint between the inner wall 22 of the glass envelope and the edge of the flare which, as previously stated, would likewise produce a weak and readily fracturable seal.

Referring to Fig. 3, showing the method of manufacturing the glass-to-metal seal between the lamp envelope 11 and the thimbles 15 and 16, a complete filament mount, comprising the filament 12, lead wires 13, 14, and flared thimbles 15, 16, is first inserted within the lamp envelope 11 and correctly positioned therein so that the thimbles are properly located and centered within the bulb necks 17, 17. As shown, the inner diameter of the bulb necks is sufficiently large to freely receive the flared thimbles 15, 16. Thimble 15 is first sealed to the adjacent bulb neck 17 by heating the glass of the said neck with a suitable flame until the metal of the flare 21 has been heated to the required temperature. The plastic glass fuses down onto the thimble 15 and flare 21 to thereby form the seal. To prevent the bunching or gathering of the fused glass, a roller 25 or other suitable forming tool is preferably applied to the glass to press the same against the metal thimble and to shape the glass in the desired manner. The glass seal is then heated slightly while it cools down in order to remove strains therein. Thimble 16 is then sealed to the other end of the lamp envelope in the same manner as thimble 15. Thereafter the lamp envelope is evacuated through the orifice 18 in thimble 16, filled if desired with a gas, and hermetically sealed by fusing the readily fusible material 20 within the thimble 16 to thereby close the orifice 18 therein.

By making the glass-to-metal seal according to the invention, all tendency of the glass to crack and break off around the rim or edge of the metallic thimble is completely eliminated. Thus, where the breakage of such glass-to-metal seals formerly was exceedingly high, by our invention such breakage has been reduced to a practically negligible amount.

Although we have shown and described only one form of the invention, it should be understood that various modifications are possible therein within the scope of the appended claim. Thus, while the invention has been shown in connection with the sealing of one end only of a metallic tube to a surrouding glass tube, it is obvious that the invention may be applied equally well to the sealing of a metallic tube wholly within a glass tube simply by forming both ends of the metallic tube with flares according to the invention.

What we claim as new and desire to secure by Letters Patent of the United States is:

An electrical device comprising a double-ended glass container having tubular and neck portions, an electric energy translation element mounted within said container, and tubular metallic end contact members fused to and along the inner walls of said neck portions and electrically connected to opposite ends of said energy translation element, the coefficient of expansion of said metallic members approximating that of the glass of said container, said metallic members extending outwardly beyond the ends of said neck portions and each being provided at its inner end with a rounded outwardly projecting flare portion extending laterally into the wall of the adjacent glass neck portion so as to be embedded therein.

WALTER J. GEIGER.
WILSON DAVIDSON.

CERTIFICATE OF CORRECTION.

Patent No. 2,221,868.

November 19, 1940.

WALTER J. GEIGER, ET AL.

It is hereby certified that error appears in the printed specification of the above numbered patent requiring correction as follows: Page 2, second column, line 52, in the claim, for the word "and" before "neck" read --end--; and that the said Letters Patent should be read with this correction therein that the same may conform to the record of the case in the Patent Office.

Signed and sealed this 4th day of March, A. D. 1941.

(Seal)

Henry Van Arsdale,
Acting Commissioner of Patents.